United States Patent
Hamada et al.

(10) Patent No.: US 7,290,271 B2
(45) Date of Patent: Oct. 30, 2007

(54) OPTICAL DISK APPARATUS

(75) Inventors: Mitsuhiro Hamada, Tamana-gun (JP); Masanari Esaki, Tikugo (JP); Yuichi Uchikawa, Miyaki-gun (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 236 days.

(21) Appl. No.: 11/175,022

(22) Filed: Jul. 6, 2005

(65) Prior Publication Data

US 2006/0010461 A1 Jan. 12, 2006

(30) Foreign Application Priority Data

Jul. 8, 2004 (JP) ............................ P2004-201549

(51) Int. Cl.
*G11B 33/14* (2006.01)
(52) U.S. Cl. .................................... 720/650
(58) Field of Classification Search ............... 720/650, 720/646, 648, 647, 673, 612; 369/75.2
See application file for complete search history.

(56) References Cited

U.S. PATENT DOCUMENTS 5,844,874 A * 12/1998 Saito et al. ................. 720/612
6,137,760 A * 10/2000 Okamoto ..................... 720/647
6,266,312 B1 * 7/2001 Akiba ......................... 720/610
6,603,723 B2 * 8/2003 Minase ........................ 720/673
7,134,128 B2 * 11/2006 Matsui et al. ............... 720/650
2002/0018426 A1 * 2/2002 Minase ....................... 369/75.2
2004/0154032 A1 * 8/2004 Fang ........................... 720/648
2004/0163094 A1 * 8/2004 Matsui et al. ............... 720/650

FOREIGN PATENT DOCUMENTS

JP 09326191 12/1997

\* cited by examiner

*Primary Examiner*—Tianjie Chen
(74) *Attorney, Agent, or Firm*—Stevens, Davis, Miller & Mosher, LLP (57) ABSTRACT

An optical disk apparatus according to the invention comprises a housing, a tray retractably mounted in the housing, and a bezel 10 adapted to close an opening of the housing 2 when the tray is accommodated in the housing 2. An electrically conductive metallic member 15 is disposed in at least one of main flat portions in the bezel 10. When the tray is accommodated in the housing, at least one surface of the conductive metallic member 15 is in contact with the housing.

7 Claims, 12 Drawing Sheets

OPTICAL DISK APPARATUS

BACKGROUND OF THE INVENTION

1. Field of the Invention

The present invention relates to an optical disk apparatus adapted to perform at least one of recording and reproducing of information on and from an optical disk by using an optical pickup.

2. Description of the Related Art

Optical disk apparatuses, such as CD-ROM/R/RW drives and DVD-ROM/RAM/R/RW drives, have already been put into practical use. Application of optical disk apparatuses to various fields, and development of high-performance optical disk apparatuses are actively performed. Especially, recently, as personal-computer market has rapidly expands, the percentage of personal computers with built-in optical disk apparatuses has been increased. A method of pulling out a tray from a housing, and then mounting an optical disk on the tray, and subsequently returning the tray into the housing (hereunder referred to as a method of the "tray type") is usually employed as a method of mounting an optical disk apparatus in an electronic apparatus. Hereinafter, description is given of the configuration of a related tray type optical disk apparatus by referring to FIGS. 7 and 8.

Figure 7:
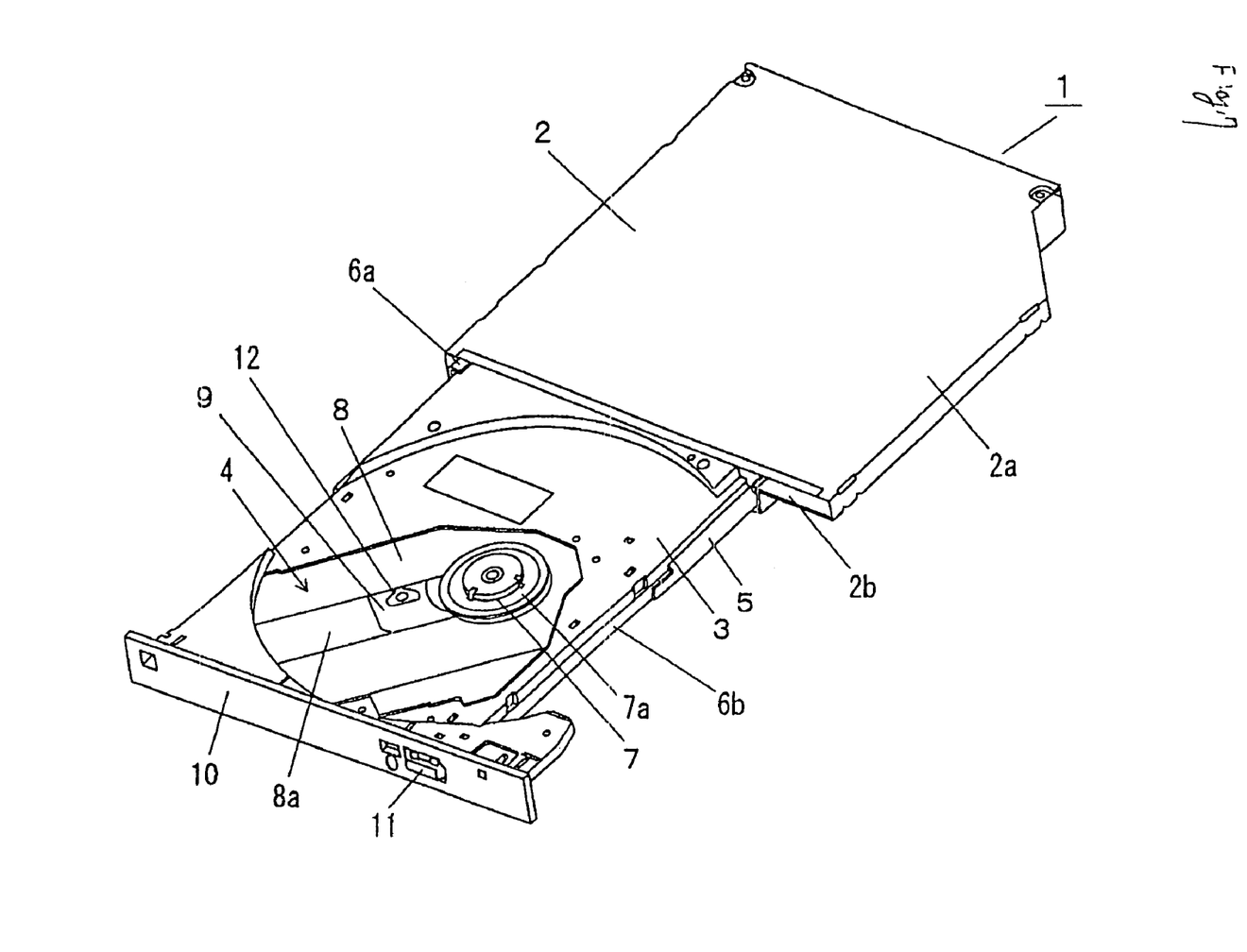
FIG. 7 is an external view illustrating a related optical disk apparatus.

FIG. 7 is an external view of the related optical disk apparatus. In FIG. 7, reference numeral 1 designates the optical disk apparatus. Reference numeral 2 denotes a housing. Reference character 2a designates an upper housing portion. Reference character 2b denotes a lower housing portion. Reference numeral 3 designates a tray. Reference numeral 4 denotes an optical pickup module. Reference numeral 5 designates a rail. Reference character 6a denotes a housing-side rail holding portion. Reference character 6b designates a tray-side rail holding portion. Reference numeral 7 denotes a spindle motor. Reference character 7a designates an optical disk mounting portion. Reference numeral 8 denotes a metallic cover. Reference character 8a designates an opening. Reference numerals 9, 10, 11, and 12 denote a carriage, a bezel, an eject button, and an optical pickup, respectively.

The optical disk apparatus 1 has the housing 2, and the tray 3 retractably held in the housing 2. The housing 2 is formed like a container by combining the metallic upper housing portion 2a with the lower housing portion 2b. The tray 3 is drawn out of and retracted into the opening of the housing 2. The optical pickup module 4 is attached to the back surface of the tray 3. The rail 5 is movably provided on both sides of the tray 3. The rail 5 is held by the tray-side rail holding portion 6b provided integrally with the tray 3. Incidentally, although FIG. 7 shows that the rail 5 is provided on only one of side surface portions of the tray 3, a similar rail may be provided on the other side surface portion. The upper housing portion 2a and the lower housing portion 2b are securely fixed to each other by catching means (not shown) and screws (not shown).

The optical pickup module 4 has at least the spindle motor 7, which is adapted to rotate-drive an optical disk, and the metallic cover 8 provided with an opening 8a extending from the spindle motor 7 to the outer periphery thereof, and the carriage 9 partly exposed from the opening 8a. The carriage 9 is movably held by plural guide shafts provided in the optical pickup module 4. Additionally, the carriage 9 can be moved by a feed motor to get close to and away from the spindle motor 7.

Reference numeral 10 designates the bezel provided on the front surface of the tray 3. The bezel 10 has a size sufficient to the extent that the opening of the housing 2 is closed. A light source such as a high-output laser diode, various optical members and an objective lens adapted to form a light spot are mounted on the carriage 9. A circuit board is fixedly provided in an inner part of the housing 2. A signal processing system IC and a power supply circuit are mounted on the circuit board. A flexible cable connecting circuit boards (not shown) provided on the tray 3 is substantially U-shaped. An external connector is connected to power-supply/signal-line provided in an electronic apparatus, such as a computer. Electric power is supplied to the optical disk apparatus 1 through this external connector. Alternatively, external signals are introduced into the optical disk apparatus 1 through the external connector. Alternatively, electrical signals generated in the optical disk apparatus 1 are outputted to an electronic apparatus through the external connector. An eject button 11 is provided in the bezel 10 provided on the front surface of the tray 3. The engagement between an engaging portion provided in the housing 2 and that provided in the tray 3 is canceled by pushing this eject button 11. Thus, the tray 3 can be drawn out from the housing 2 thereby to dismount an optical disk therefrom and to mount an optical disk thereon.

Figure 8:
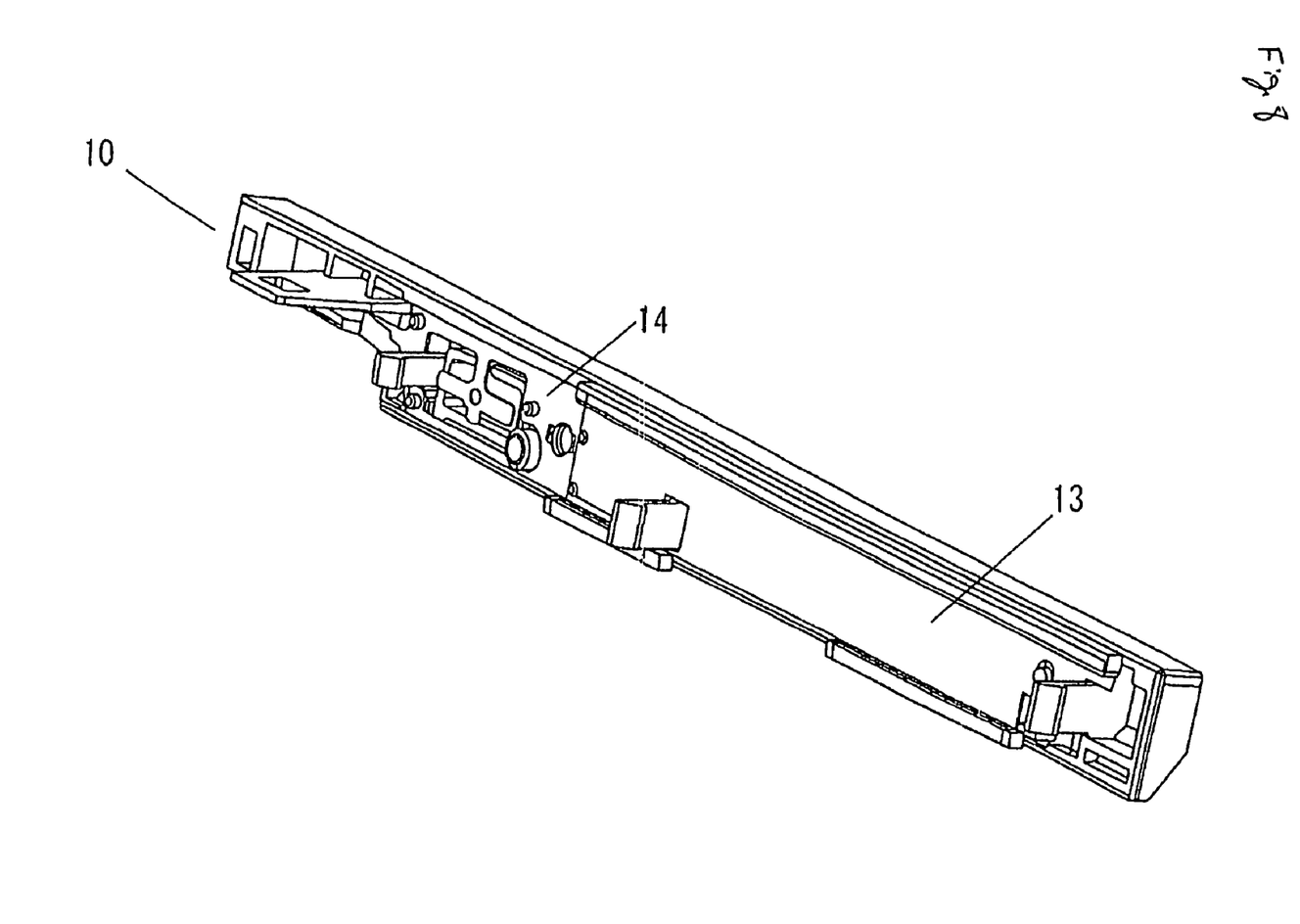
FIG. 8 is a view illustrating a bezel of the related optical disk apparatus.

FIG. 8 is a view showing the bezel and an electrically conductive cloth of the related optical disk apparatus. This figure shows a main flat portion provided opposite to the surface on which the eject button 11 is provided. Further, this figure shows that one of two flat portions is partly covered with both a metallic plate 14 and the conductive cloth 13. In FIG. 8, reference numerals 10, 13, and 14 designate the bezel, the conductive cloth, and the metallic plate, respectively. The conductive cloth 13 is an electrically conductive cloth material and has effects of shielding electromagnetic waves and so on. The metallic plate 14 is formed substantially like a flat plate by using an electrically conductive material, such as a stainless steel. The metallic plate 14 is intended to be a countermeasure against static electricity affecting the optical disk apparatus 1 through the eject button 11. The bezel 10 is combined with the upper housing portion 2a and the lower housing portion 2b to thereby close the opening of the container-like housing 2. Thus, the bezel 10 serves to prevent dust from entering the housing 2 and to prevent a user from touching the inside of the optical disk apparatus 1. Simultaneously, it is necessary for the bezel 10 to prevent electromagnetic waves generated by other electronic apparatuses, such as a portable phone, from entering the optical disk apparatus 1 to thereby cause malfunctions and troubles of the optical disk apparatus 1. Thus, generally, countermeasures against external electromagnetic waves are applied to the entire surface of the main flat portion provided opposite to the surface, on which the eject button 11 is provided, in the bezel 10. Usually, the metallic plate 14 serving as a countermeasure against static electricity, which affects the optical disk apparatus 1 when a user pushes the eject button 11, is provided only in the vicinity of the eject button 11 in the main flat portion provided opposite to the surface, on which the eject button 11 is provided, in the bezel 10. Thus, the rest of this main flat portion is covered with the conductive cloth 13. In a case where the conductive cloth 13 is not provided in the bezel 10, and where external electromagnetic waves enter the optical disk apparatus 1, an actuator coil of the optical pickup 12 performs resonant oscillations. Consequently, the following malfunctions and troubles occur. That is, the movement of the optical pickup 12 cannot be controlled. A malfunction of a laser power detecting means of the optical pickup 12 occurs, so that laser power cannot be controlled.

Noises are caused in signals through the pattern formed on the circuit board and the flexible cable.

Related art is disclosed in JP9-326191.

To prevent external electromagnetic waves from entering the optical disk apparatus 1, it is necessary to apply countermeasures to the housing 2 and the bezel 10, which cover the entire optical disk apparatus 1. The housing 2 is usually made of an electrically conductive metallic material and has no problems. However, the bezel 10 is usually made of a resin material, which is the same as the material of the exterior of a personal computer, so as to establish unity of design between the bezel 10 and the personal computer in which the bezel 10 is mounted. Therefore, the conductive cloth 13 is added to the portion that is not covered with the metallic plate 14 serving as the countermeasure against static electricity, which is applied to an inner side of the bezel 10, that is, applied to the main flat portion placed opposite to the surface provided with the eject button 11, to thereby prevent electromagnetic waves from entering the optical disk apparatus 1 through the main flat portion of the bezel 10.

However, in a case where the bezel 10 is covered with both the metallic plate 14 and the conductive cloth 13 shown in FIG. 8, it is necessary to bring a part of the conductive cloth 13, which covers the bezel 10, into contact with the housing 2 thereby to assure a grounding line. An operation of attaching the conductive cloth 13 to the bezel 10, which is performed so as to reliably put the conductive cloth 13 into contact with the housing 2, is very difficult. This results in reduction of productivity. Additionally, because the conductive cloth 13 is made of cloth, it is difficult to control the position of the conductive cloth 13. Consequently, variation in the electromagnetic wave shielding characteristics is caused.

SUMMARY OF THE INVENTION

The invention is accomplished to solve the problems. An object of the invention is to provide an optical disk apparatus enabled to surely prevent external electromagnetic waves, which adversely affect an operation of the optical disk apparatus, by a simple configuration from entering the optical disk apparatus, and also enabled to stabilize electromagnetic shielding characteristics and enhance the productivity thereof.

According to the invention, there is provided an optical disk apparatus that comprises a housing, a tray retractably mounted in the housing, and a bezel adapted to close an opening of the housing when the tray is accommodated in the housing. A metallic member is disposed in the bezel. When the tray is accommodated in the housing, at least a part of the metallic member is in contact with the housing.

With the aforementioned configuration, the grounding line for the housing and the metallic members is strongly assured. Thus, the invention can surely prevent external electromagnetic waves by the simple configuration from entering the optical disk apparatus through one of the main flat portions of the bezel, which is one flat surface of the exterior of the optical disk apparatus.

Consequently, the invention can reliably prevent external electromagnetic waves, which adversely affect an operation of the optical disk apparatus, by the simple configuration from entering the optical disk apparatus. Thus, the invention can realize an optical disk apparatus enabled to stabilize the electromagnetic wave shielding characteristics and to enhance productivity.

DESCRIPTION OF THE PREFERRED EMBODIMENTS

First Embodiment

Figure 1:
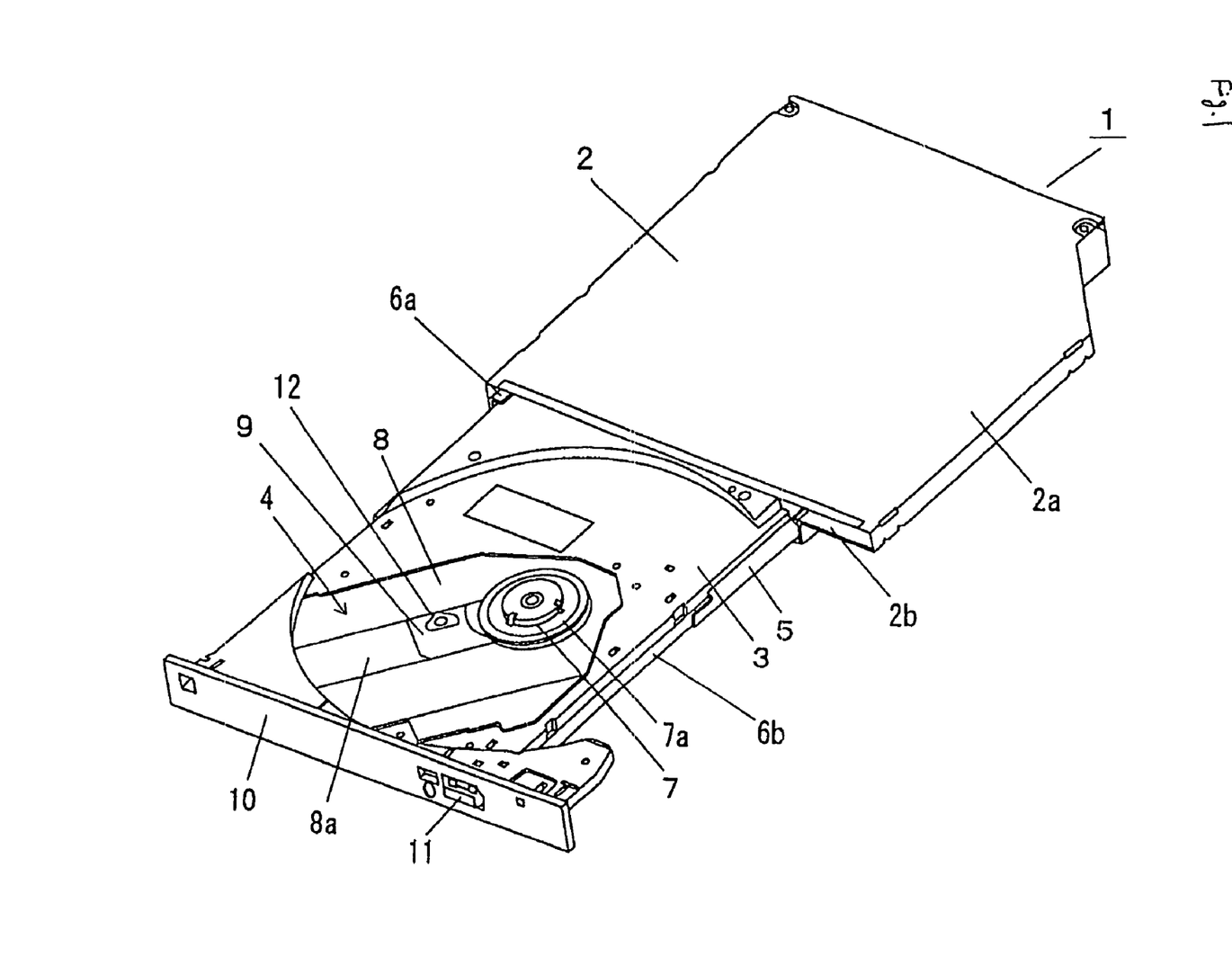
FIG. 1 is an external view illustrating an optical disk apparatus according to an embodiment of the invention.

FIG. 1 is an external view illustrating an optical disk apparatus according to an embodiment of the invention. This figure shows a manner in which a tray 3 is drawn out from a housing 2. In FIG. 1, reference numeral 1 designates the optical disk apparatus. Reference numeral 2 denotes the housing. Reference numeral 3 designates the tray. Reference numeral 4 denotes an optical pickup module. Reference numeral 5 designates a rail. Reference character 6a denotes a housing-side rail holding portion. Reference character 6b designates a tray-side rail holding portion. Reference numeral 7 denotes a spindle motor. Reference character 7a designates an optical disk mounting portion. Reference numeral 8 denotes a metallic cover. Reference character 8a designates an opening. Reference numerals 9, 10, 11, and 12 denote a carriage, a bezel, an eject button, and an optical pickup, respectively.

As shown in FIG. 1, the housing 2 is formed like a container by combining the upper housing portion 2a with the lower housing portion 2b. Preferably, the upper housing portion 2a and the lower housing portion 2b are firmly fixed to each other by using screws. The material of the housing 2 is a metal material, such as iron, an iron alloy, aluminum, an aluminum alloy, and a magnesium alloy, or a resin material. The upper housing portion 2a and the lower housing portion 2b may be made of a same material. Alternatively, the upper housing portion 2a and the lower housing portion 2b may be made of different kinds of materials, respectively. The average thickness of the main flat portion of each of the upper housing portion 2a and the lower housing portion 2b ranges from 0.4 mm to 1.6 mm. In a case where the average thickness is relatively small, the upper housing portion 2a and the lower housing portion 2b are made of a metal material. Further, the upper housing portion 2a and the lower housing portion 2b are formed by, for instance, pressing a metal plate. Conversely, in a case where the average thickness is relatively large, the upper housing portion 2a and the lower housing portion 2b are made of a resin material or are formed by die-casting an aluminum alloy or a magnesium alloy. In a case where the housing 2 is made of a resin material, reduction in the weight of the optical disk apparatus 1 can be achieved.

The tray 3 retractably provided in the housing 2 comprises a resin frame. The optical pickup module 4 is provided on the tray 3.

The optical pickup module (PUM) 4 includes an optical system that comprises an optical pickup 12, a spindle motor 7, which rotates an optical disk, and a control circuit (not shown). The optical pickup 12 performs at least one of writing and reading of information to and from an optical disk by irradiating light onto the optical disk. The spindle motor 7 is provided with the optical disk mounting portion 7a, in which an optical disk is mounted, and rotate-drives the optical disk.

The tray-side rail holding portions 6b are provided on both side portions of the tray 3, respectively. Both side portions of the tray 3 are fitted to the rails 5 slidably in a direction in which an optical disk is drawn out. The rails 5 are fitted to rail guides provided in the inner surfaces of both side portions of the housing 2 slidably in the direction in which an optical disk is drawn out. Thus, the tray 3 can be drawn out of the housing 2 so that an optical disk is dismounted therefrom and mounted thereon again.

A control board is fixedly provided in an inner part of the housing 2. A signal processing system IC and a power supply circuit are mounted on the control board. A flexible printed circuit board connecting control boards (not shown) provided on the tray 3 is substantially U-shaped. An external connector is connected to power supply/signal line provided in an electronic apparatus, such as a computer. Electric power is supplied to the optical disk apparatus 1 through this external connector. Alternatively, external signals are introduced into the optical disk apparatus 1 through the external connector. Alternatively, electrical signals generated in the optical disk apparatus 1 are outputted to an electronic apparatus through the external connector. An eject button 11 is provided in the bezel 10 provided on the front surface of the tray 3. The engagement between an engaging portion provided in the housing 2 and that provided in the tray 3 is canceled by pushing this eject button 11.

Hereinafter, characterizing portions of the first embodiment of the invention are described.

Figure 2:
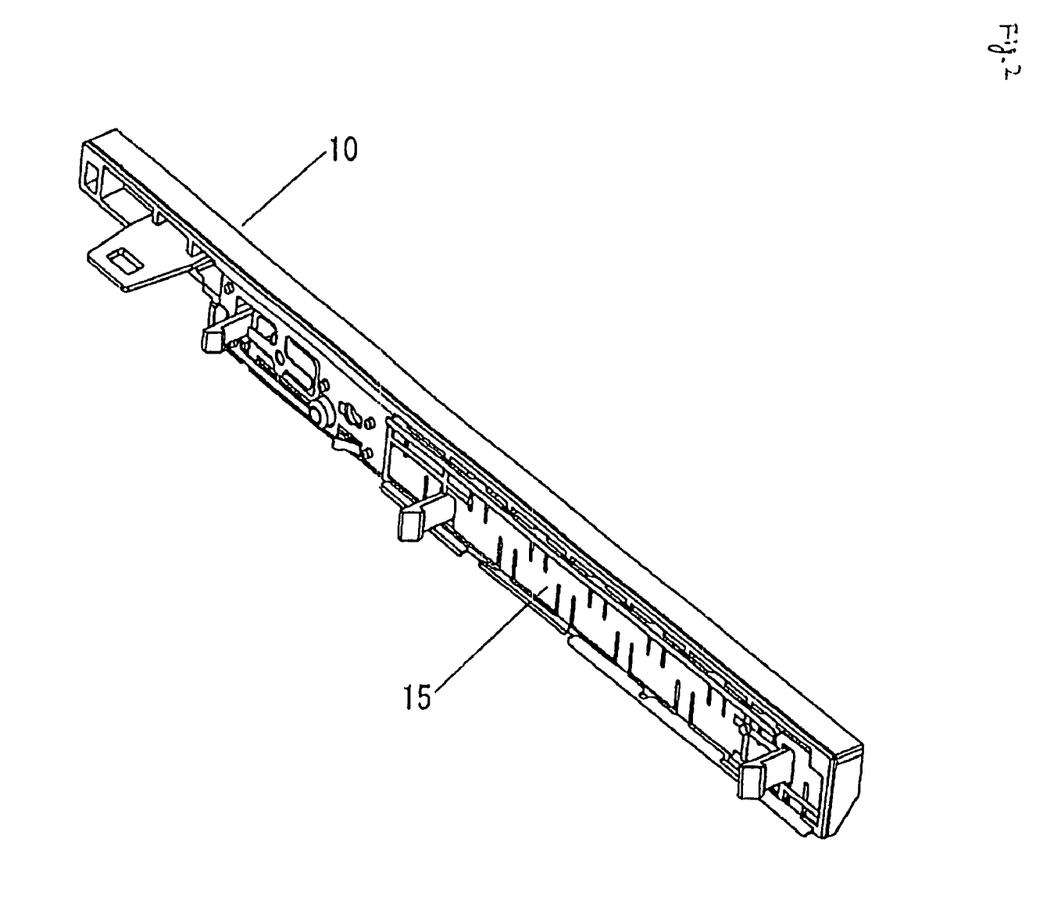
FIG. 2 is a view illustrating a bezel and an electrically conductive metallic member of the optical disk apparatus according to the embodiment of the invention.
Figure 3A:
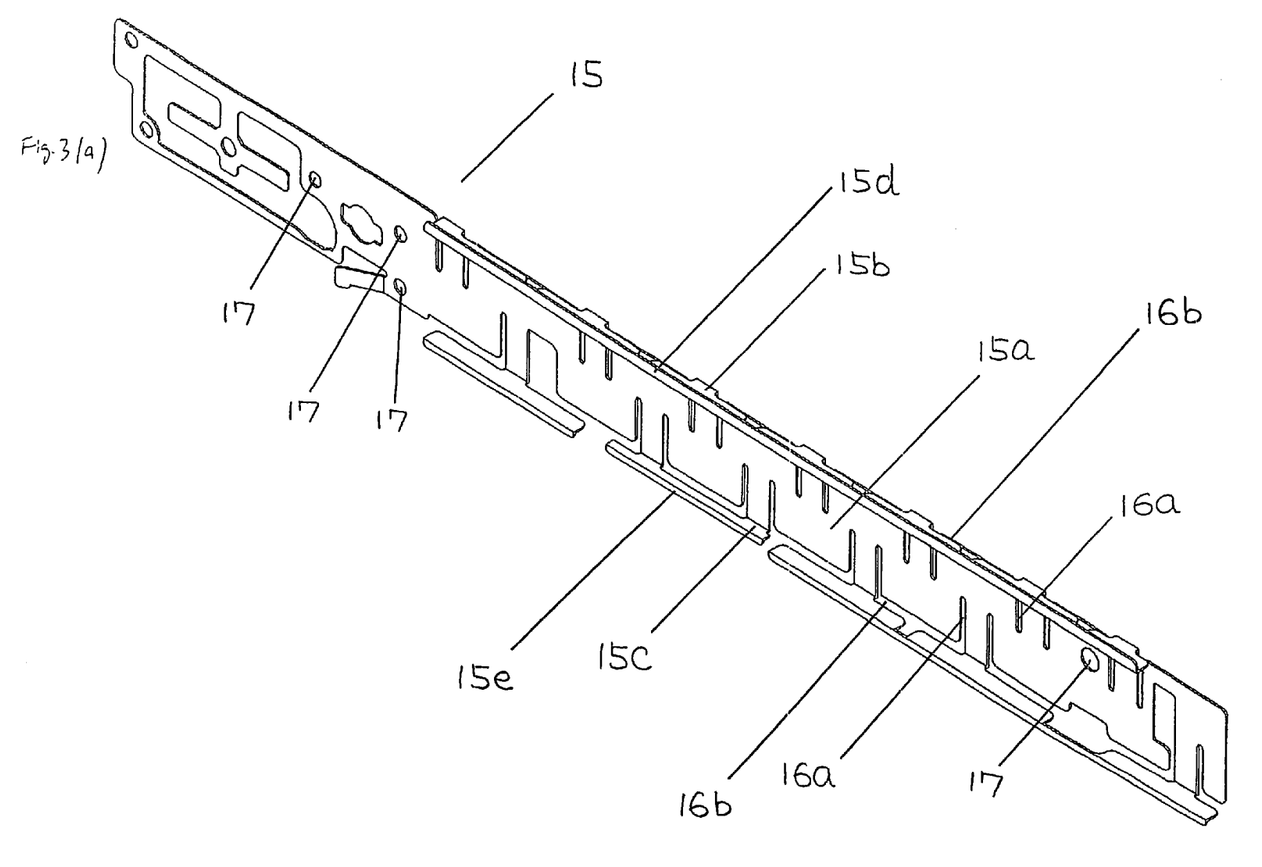
FIGS. 3A to 3E are views each illustrating a metallic member of the optical disk apparatus according to the embodiment of the invention.
Figure 3B:
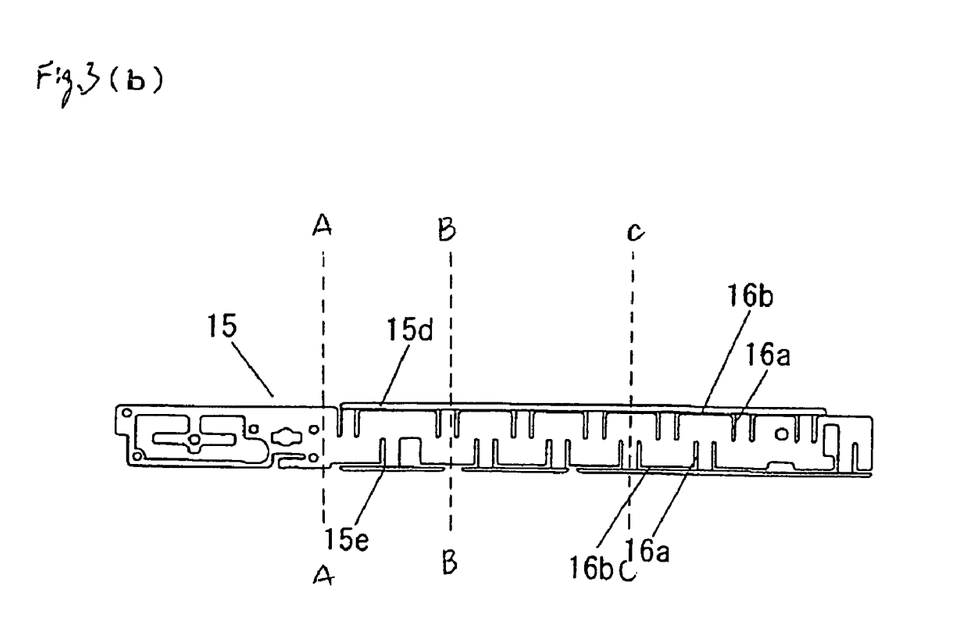
Figure 3C:
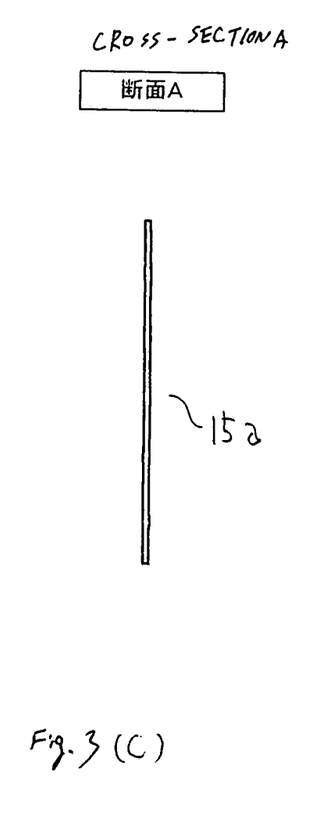
Figure 3D:
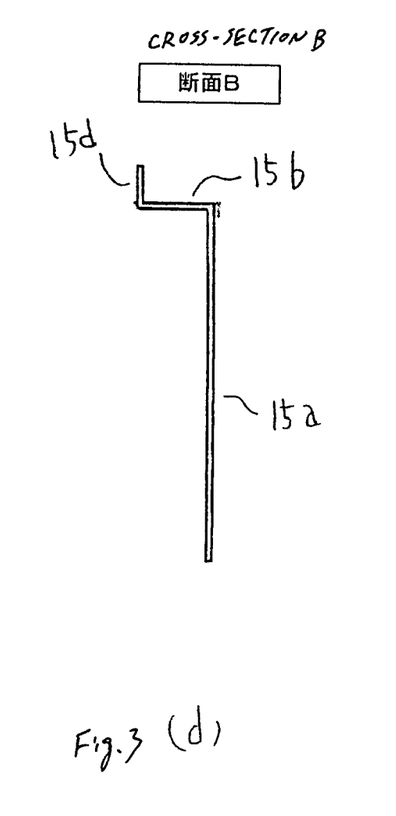
Figure 3E:
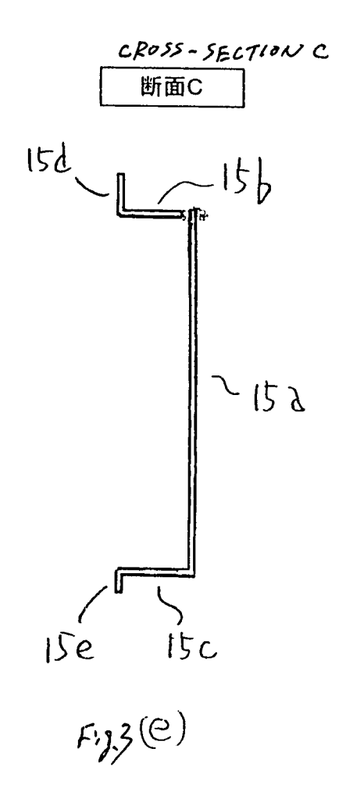

FIG. 2 is a view illustrating the bezel and the metallic member of the optical disk apparatus according to the embodiment of the invention. This figure shows a main flat portion provided opposite to a surface on which the eject button 11 is provided. The electrically conductive metallic member is used as an electromagnetic wave shield. FIGS. 3A to 3E are views each illustrating the metallic member of the optical disk apparatus according to this embodiment of the invention. FIG. 3A is an external perspective view of the metallic member, which is taken from the tray side. FIG. 3B is a plan view of the metallic member, which is taken from the tray side. FIG. 3C is a cross-sectional view taken along line A-A shown in FIGS. 3A and 3B. FIG. 3D is a cross-sectional view taken along line B-B shown in FIGS. 3A and 3B. FIG. 3E is a cross-sectional view taken along line C-C shown in FIGS. 3A and 3B.

Figure 4:
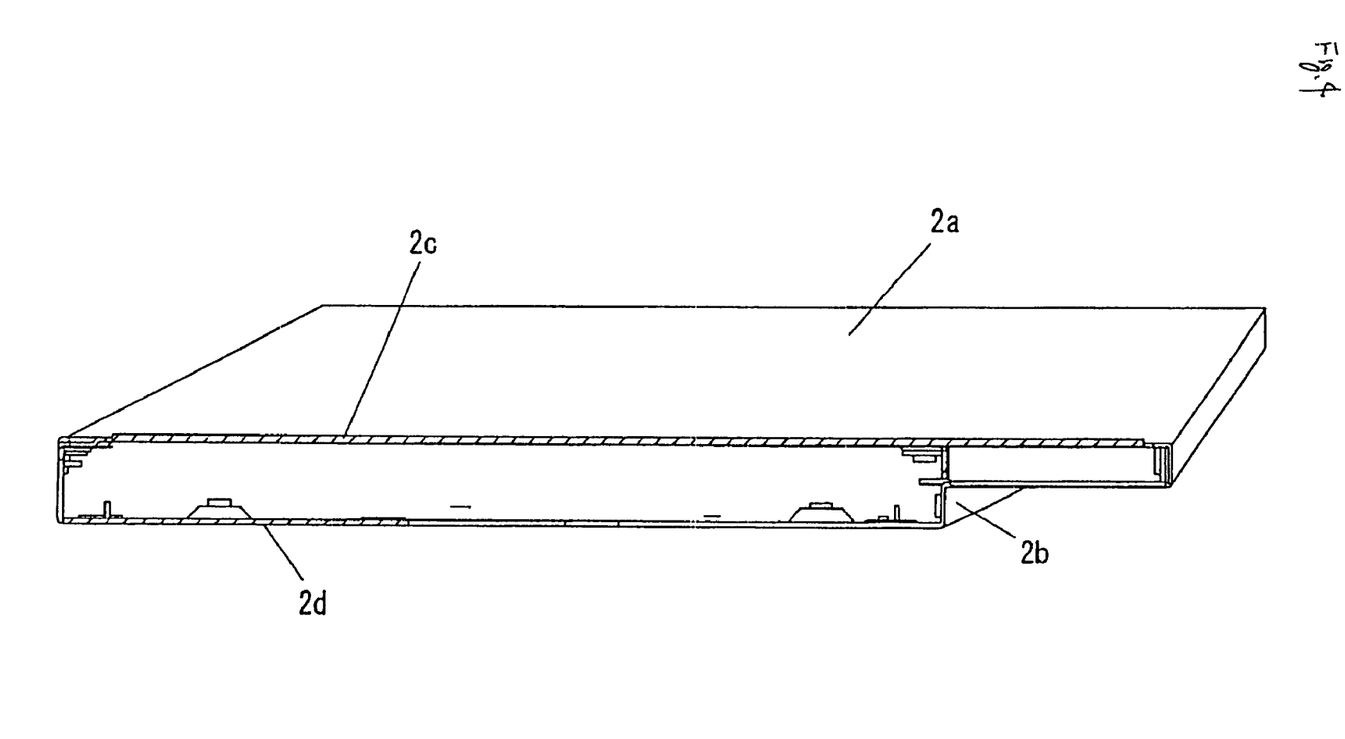
FIG. 4 is a view illustrating a housing of the optical disk apparatus according to the embodiment of the invention.
Figure 5A:
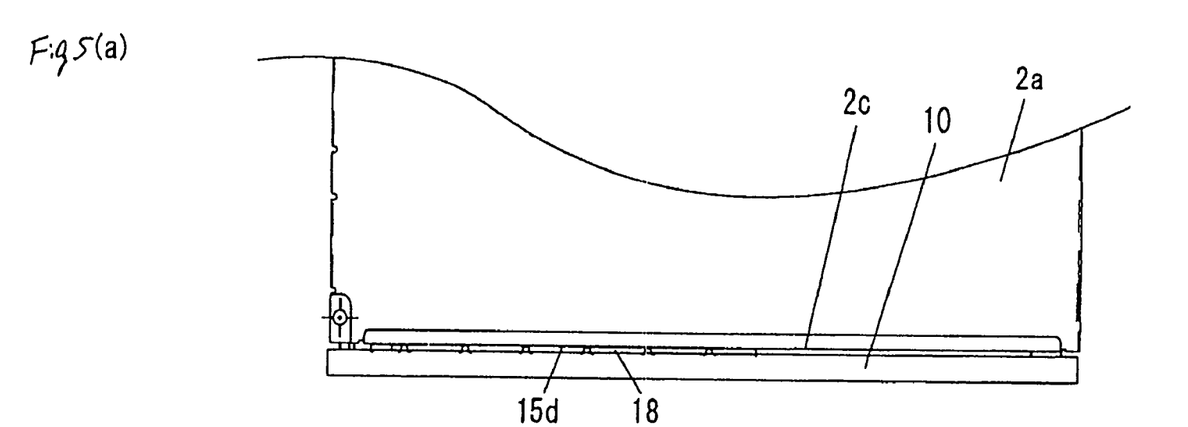
FIGS. 5A and 5B are views each illustrating a manner in which the housing and the electrically conductive metallic member of the optical disk apparatus according to the embodiment of the invention are in contact with each other.
Figure 5B:
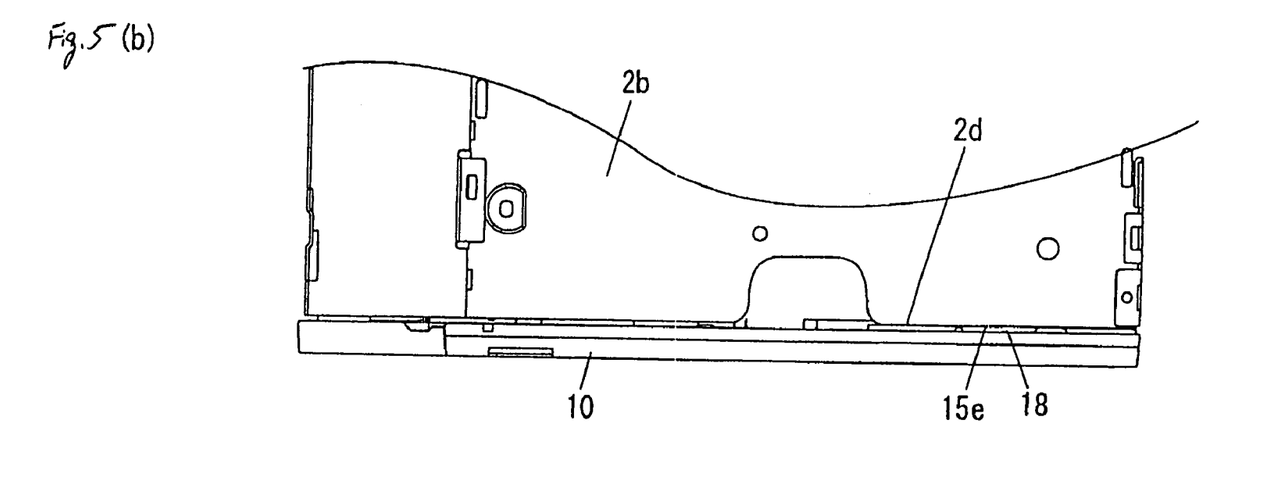
Figure 6:
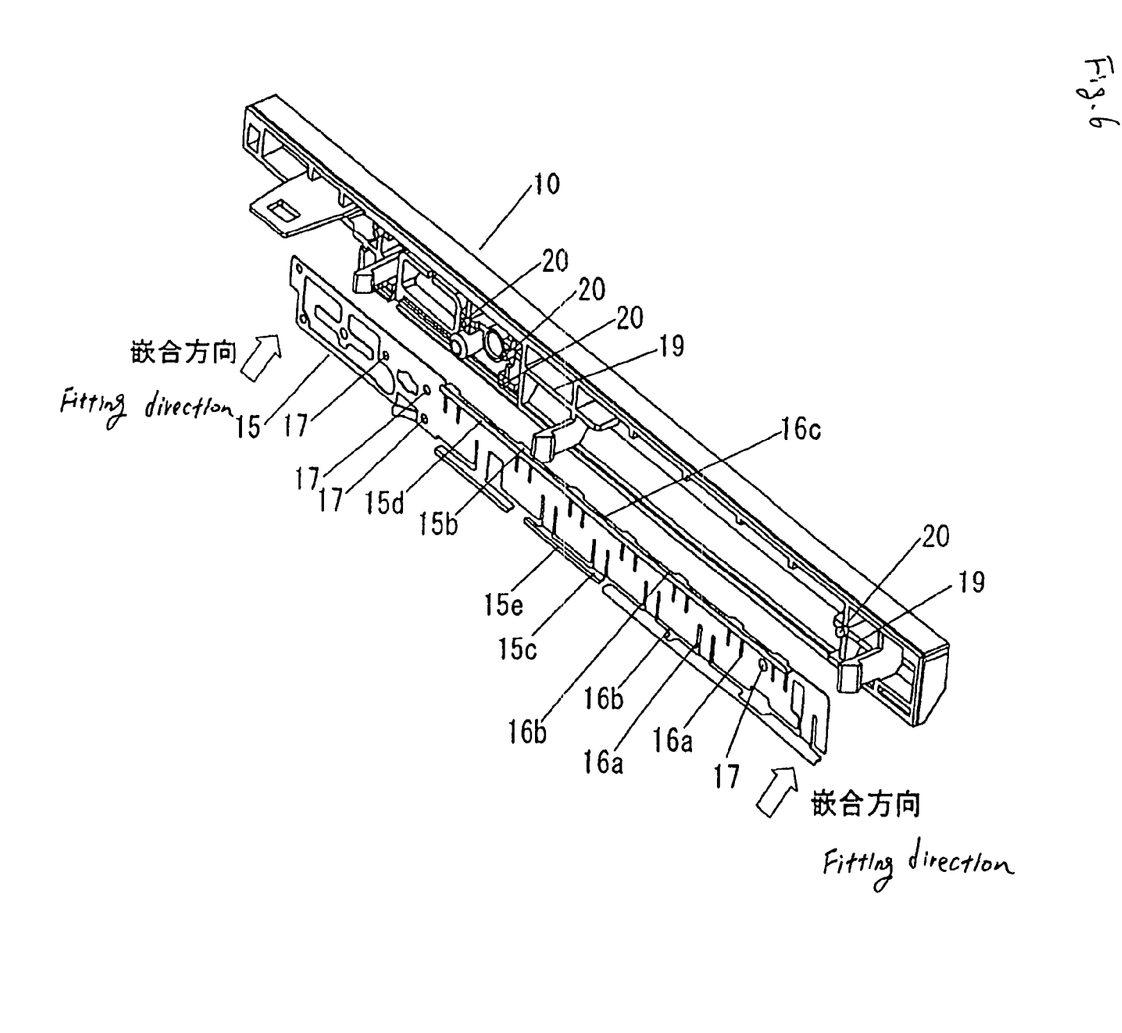
FIG. 6 is a view illustrating a manner in which the bezel and the metallic member of the optical disk apparatus of the invention are assembled.

FIG. 4 is an external perspective view, which is taken from the bezel side and illustrates the housing of the optical disk apparatus according to the embodiment of the invention. FIGS. 5A and 5B are views each showing a manner in which the housing and the electrically conductive metallic member of the optical disk apparatus according to the embodiment of the invention are in contact with each other. FIG. 5A is a view showing the upper housing portion. FIG. 5B is a view showing the lower housing portion. FIG. 6 is a view illustrating a manner in which the bezel and the metallic member of the optical disk apparatus of the invention are assembled. In FIGS. 2 to 6, reference character 2a designates the upper housing portion. Reference character 2b denotes the lower housing portion. Reference characters 2c and 2d designate surfaces. Reference numeral 10 denotes the bezel. Reference numeral 11 designates the eject button. Reference numeral 15 denotes the metallic member. Reference characters 15a, 15b, 15c, 15d, and 15e designate a first piece, a second piece, a third piece, a fourth piece, and a fifth piece, respectively. Reference characters 16a, 16b, and 16c denote notches. Reference numerals 17, 18, 19, and 20 designate a through hole, a gap, a projection, and another projection, respectively.

The upper housing portion 2a and the lower housing portion 2b are combined with each other to thereby close the opening of the housing 2 formed like a container. Thus, the bezel 10 serves to prevent dust from entering the housing 2 and to prevent a user from touching the inside of the optical disk apparatus 1. Simultaneously, to prevent electromagnetic waves generated by other electronic apparatuses, such as a portable phone, from entering the optical disk apparatus 1 to thereby cause malfunctions and troubles of the optical disk apparatus 1, generally, countermeasures against external electromagnetic waves are applied to the entire surface of the main flat portion provided opposite to the surface, on which the eject button 11 is provided, in the bezel 10. Usually, the metallic plate 14 serving as a countermeasure against static electricity, which affects the optical disk apparatus 1 when a user pushes the eject button 11, is provided only in the vicinity of the eject button 11 in the main flat portion provided opposite to the surface, on which the eject button 11 is provided, in the bezel 10. Thus, the rest of this main flat portion is covered with the conductive cloth 13.

The invention features that the electrically conductive metallic member 15 made of stainless steel, copper, iron, aluminum, or an alloy thereof is disposed in the bezel 10, and that at least a part of the electrically conductive metallic member 15 is in contact with the housing 2.

In this embodiment, as shown in FIG. 2, the electrically conductive metallic member 15 is disposed on at least one of the main flat portions of the bezel 10, that is, at least the main flat portion provided opposite to the surface, on which the eject button 11 is provided. Stainless steel is selected as the material of the electrically conductive metallic member 15, in consideration of elasticity of the material.

As shown in FIGS. 3A to 3E, the metallic member 15 includes the first piece 15a, the second piece 15b, the third piece 15c, the fourth piece 15d, and the fifth piece 15e, which are adapted so that the first piece 15a is in contact with the main flat portion of the bezel 10, that each of the second piece 15b and the third piece 15c adjoins the first piece 15a by being inclined thereto by substantially 90°, and that each of the fourth piece 15d and the fifth piece 15e adjoins a corresponding one of the second piece 15b and the third piece 15c by substantially 90°. The second piece 15b is assumed to face the third piece 15c so that the pieces 15b and 15c extend in parallel to each other. Also, the fourth piece 15d and the fifth piece 15e are assumed to be in contact with the housing 2. Incidentally, the configuration shown in FIGS. 3A to 3E can be formed by performing punching on a metallic plate to thereby form notches, and by then folding back the pieces.

Incidentally, the first piece 15a of the metallic member 15, which is in contact with the main flat portion of the bezel 10, may be in direct contact with the main flat portion of the bezel 10. Alternatively, the first piece 15a may be supported by the projection 19 extending from the main flat portion of the bezel 10. In this embodiment, the first piece 15a is supported by the projection 19 extending from the main flat portion of the bezel 10 so as to facilitate the assembling of the electrically conductive metallic member 15, at which an amount of insertion of the metallic member 15 into the bezel 10 is small, and the bezel 10.

As shown in FIG. 2, the metallic member 15 is provided on the main flat portion provided opposite to the main flat portion on which the eject button 11 of the bezel 10 is provided. That is, the metallic member 15 is provided on the surface at the side of the housing 2, in the bezel 10. Thus, the metallic member 15 is disposed between the bezel 10 and the housing 2. Incidentally, the metallic member 15 may be provided on the surface on which the eject button 11 is provided. However, this is not preferable in view of the productivity and the material cost, because an additional decorative plate is necessary in this case so as to prevent the metallic member 15 from being exposed on the surface on which the eject button 11 is provided.

The fourth piece 15d and the fifth piece 15e of the metallic member 15 are in contact with a surface 2c extending in the direction of thickness of the main flat portion of the upper housing portion 2a and with a surface 2d extending in the direction of thickness of the main flat portion of the lower housing portion 2b, respectively. The angle formed between the first piece 15a and the second piece 15b and the angle formed between the first piece 15a and the third piece 15c are about 90°, that is, range from about 85° to about 95°. The angle formed between the second piece 15b and the fourth piece 15d and the angle formed between the third piece 15c and the fifth piece 15e are about 90°, that is, range from about 85° to about 95°. The angle formed between the second piece 15b and the third piece 15c, which face each other and are substantially parallel to each other, ranges from 170° to 190°. With such a configuration, a space occupied by the metallic member 15 in the housing 2 can be reduced. The second piece 15b and the third piece 15c are moved by the elastic force of the metallic member 15 substantially in parallel to the main flat portion of the housing 2. This enables the fourth piece 15d and the fifth piece 15e to be easily brought into contact with the surfaces 2c and 2d extending in the direction of thickness of the main flat portion of the housing 2. Further, in a case where both the contact between the fourth piece 15d of the metallic member 15 and the surface 2c of the housing 2 and the contact between the fifth piece 15e of the metallic member 15 and the surface 2d of the housing 2 occur simultaneously, the invention can obtain the highest advantage. However, practically, in consideration of the cost of forming the metallic member 15, a pair of the second piece 15b and the fourth piece 15d or a pair of the third piece 15c and the fifth piece 15e may be omitted. Additionally, only the fourth piece 15d and the fifth piece 15e of the metallic member 15 may be omitted.

Consequently, the contact between the housing 2 and at least one of the pieces of the electrically conductive metallic member 15 enables the apparatus to strongly assure the grounding line for each of the housing 2 and the electrically conductive metallic member 15. Thus, external electromagnetic waves can surely be prevented by a simple configuration from entering the optical disk apparatus through the main flat portion of the bezel, which is one flat surface of the exterior of the optical disk apparatus 1. Each of the contact between the fourth piece 15d of the metallic member 15 and the surface 2c extending in the direction of thickness of the housing 2 and the contact between the fifth piece 15e of the metallic member 15 and the surface 2d extending in the direction of thickness of the housing 2 can be set to be the surface contact therebetween. Additionally, the electrically conductive metallic member 15 and the bezel 10 can easily be in contact with each other substantially without being affected by the assembling precision.

Thus, external electromagnetic waves, which adversely affect an operation of the optical disk apparatus 1, can surely be prevented by a simple configuration from entering the optical disk apparatus 1. Consequently, the invention can realize a driving support apparatus enabled to stabilize electromagnetic shielding characteristics and enhance the productivity thereof. Further, in this embodiment, notches 16a and 16b are provided in the first piece 15a of the electrically conductive metallic member 15, as shown in FIGS. 3A to 3E. Consequently, the elastic force of the metallic member 15 can be enhanced, so that the movable distances of the fourth piece 15d and the fifth piece 15e can be increased. Additionally, an electrically conductive sheet may be stuck to a through hole formed by providing the notch 16a or 16b. Consequently, the reliability of the shielding effect of the metallic member 15 can be further enhanced.

As shown in FIGS. 5A and 5B, when the tray 3 is accommodated in the housing 2, there is a gap between the bezel 10 and at least one of the fourth piece 15d and the fifth piece 15e of the metallic member 15, which is in contact with the housing 2. This gap 18 enables at least one of the fourth piece 15d and the fifth piece 15e to be easily brought into surface contact with the surface 2c or 2d extending in the direction of thickness of the main flat portion of the housing 2. The contactability between the piece and the surface can be improved. Additionally, the contactability between the fourth piece 15d of the metallic member 15 and the surface 2c extending in the direction of thickness of the housing 2 and between the fifth piece 15e of the metallic member 15 and the surface 2d extending in the direction of thickness of the housing 2 is enhanced still more by disposing an elastic body made of urethane resin foam or styrene resin foam into the gap 18 provided between the bezel 10 and at least one of the fourth piece 15d and the fifth piece 15e of the metallic member 15. Incidentally, the shapes of the notches 16a and 16b provided in the main flat portion 15e of the electrically conductive metallic member 15 are not limited to those of the notches shown in FIGS. 2 and 3A to 3E. The number of notches provided therein is not limited to that of notches shown in FIGS. 2 and 3A to 3E. The necessity of the notches 16a and 16b may be eliminated according to the quality and the thickness of the electrically conductive metallic material 15. Also, the area of the surface 2c can be increased by folding back the surface extending in the direction of thickness of the main flat portion of the upper housing portion 2a in this embodiment. Thus, the contact area between the fourth piece 15d of the metallic member 15 and the surface 2c of the upper housing portion 2a can be increased. Similarly, the area of the surface 2d can be increased by folding back the surface extending in the direction of thickness of the main flat portion of the upper housing portion 2a in this embodiment. Thus, the contact area between the fifth piece 15e of the metallic member 15 and the surface 2d of the upper housing portion 2b can be increased. The metallic member 15 is fitted to the main flat portion of the bezel 10 in a direction perpendicular to the main flat portion thereof, as shown in FIG. 6. The position of the metallic member 15 is controlled by utilizing the notch 16c and through holes 17 provided in the metallic member 15. The fitting of the metallic member 15 to the bezel 10 is performed by passing fitting projections 20, which are provided on the bezel 10, through the notch 16c and the through holes 17 provided in the metallic member 15 and by welding the projections 20. Although the fitting of the metallic member 15 to the bezel 10 may be performed in another way by utilizing screws and key-type projections and by being fixed by an adhesive, it is preferable in this embodiment, which needs a fitting method that excels in productivity and uses a relatively small space, that the fitting projections 20 provided on the bezel 10 are passed through the notch 16c and the through holes 17 provided in the metallic member 15 and are then welded. Consequently, the metallic member 15 and the bezel 10 can easily be assembled. Also, the position control can easily be performed between the electrically conductive metallic member 15 and the bezel 10.

Hereunder, a related electromagnetic wave shield serving as a countermeasure against external electromagnetic waves, which is applied to the bezel 10, is described. To prevent external electromagnetic waves from entering the optical disk apparatus 1, it is necessary to apply countermeasures to the housing 2 and the bezel 10, which cover the entire optical disk apparatus 1. The housing 2 is usually made of an electrically conductive metallic material and has no problems. However, the bezel 10 is usually made of a resin material, which is the same as the material of the exterior of a personal computer, so as to establish unity of design between the bezel 10 and the personal computer in which the bezel 10 is mounted. Therefore, generally, countermeasures against external electromagnetic waves are applied to the inner side of the bezel 10, that is, the entire main flat portion provided opposite to the surface on which the eject button 11 is provided. Usually, the conductive cloth 13 is caused to cover the portion that is not covered with the metallic plate 14 serving as the countermeasure against static electricity to thereby prevent electromagnetic waves from entering the optical disk apparatus 1.

However, in a case where the bezel 10 is covered with both the metallic plate 14 and the conductive cloth 13 shown in FIG. 8, it is necessary to bring a part of the conductive cloth 13, which covers the bezel 10, into contact with the housing 2 thereby to assure the grounding line. An operation of attaching the conductive cloth 13 to the bezel 10, which is performed so as to reliably put the conductive cloth 13 into contact with the housing 2, is very difficult. This results in reduction of productivity. Additionally, because the conductive cloth 13 is made of cloth, it is uneasy to control the position of the conductive cloth 13. Consequently, variation in the electromagnetic wave shielding characteristics is caused.

Additionally, because the conductive cloth 13 is made of cloth, it is difficult to control the position of the conductive cloth 13. Consequently, variation in the electromagnetic wave shielding characteristics is caused.

However, in the embodiment of the invention, the electrically conductive metallic material 15 is disposed on at least one of the main flat portions of the bezel 10. Also, at least one of the surfaces of the electrically conductive metallic member 15 is in contact with the housing 2. Thus, the electrically conductive metallic member 15 serves as the electromagnetic wave shield. Moreover, the grounding line for each of the housing 2 and the electrically conductive metallic member 15 is strongly and reliably assured. Consequently, external electromagnetic waves, which adversely affect an operation of the optical disk apparatus 1, can surely be prevented by a simple configuration from entering the optical disk apparatus 1 through the main flat portion of the bezel, which is one flat surface of the exterior of the optical disk 1.

Consequently, this embodiment can reliably prevent external electromagnetic waves, which adversely affect an operation of the optical disk apparatus 1, by the simple configuration from entering the optical disk apparatus 1. Thus, this embodiment can realize an optical disk apparatus enabled to stabilize the electromagnetic wave shielding characteristics and to enhance productivity.

Incidentally, in this embodiment, the angle formed between the first piece 15a and the second piece 15b of the metallic member 15 and the angle formed between the first piece 15a and the third piece 15c thereof are set to be about 90°, that is, set to range from about 85° to about 95°. The angle formed between the second piece 15b and the fourth piece 15d and the angle formed between the third piece 15c and the fifth piece 15e are set to be about 90°, that is, set to range from about 85° to about 95°. The angle formed between the second piece 15b and the third piece 15c, which face each other and are substantially parallel to each other, is set to range from 170° to 190°. However, it is sufficient that the fourth piece 15d and the fifth piece 15e can be in contact with at least one of the surface 2c, which extends in the direction of thickness of the main flat portion of the upper housing portion 2a of the housing 2, and the surface 2d, which extends in the direction of thickness of the main flat portion of the upper housing portion 2b. Therefore, the conditions set on the angles among the pieces of the metallic member 15 are not limited to the aforementioned conditions that the angle formed between the first piece 15a and the second piece 15b of the metallic member 15 and the angle formed between the first piece 15a and the third piece 15c thereof are set to be about 90°, namely, set to range from about 85° to about 95°, that the angle formed between the second piece 15b and the fourth piece 15d and the angle formed between the third piece 15c and the fifth piece 15e are set to be about 90°, namely, set to range from about 85° to about 95°, and that the angle formed between the second piece 15b and the third piece 15c, which face each other and are substantially parallel to each other, is set to range from 170° to 190°. It is preferable for realizing the configuration of the apparatus of the invention in a minimum space that the angle formed between the first piece 15a and the second piece 15b of the metallic member 15 and the angle formed between the first piece 15a and the third piece 15c thereof are set to be about 90°, namely, set to range from about 85° to about 95°, that the angle formed between the second piece 15b and the fourth piece 15d and the angle formed between the third piece 15c and the fifth piece 15e are set to be about 90°, namely, set to range from about 85° to about 95°, and that the angle formed between the second piece 15b and the third piece 15c, which face each other and are substantially parallel to each other, is set to range from 170° to 190°. Further, the condition set on the contact between the housing 2 and each of the fourth piece 15d and the fifth piece 15e of the metallic member 15 is not limited to the condition that the fourth piece 15d is in contact with the surface 2c extending in the direction of thickness of the main flat portion of the upper housing portion 2a of the housing 2, and that the fifth piece 15e is in contact with the surface 2d extending in the direction of thickness of the main flat portion of the upper housing portion 2b thereof. However, it is preferable for maximizing the shielding effect against external electromagnetic waves that the fourth piece 15d and the fifth piece 15e of the metallic member 15 are in contact with the upper housing portion 2a and the lower housing portion 2b of the housing 2, respectively. Although the contact between the housing 2 and each of the fourth piece 15d and the fifth piece 15e of the metallic member 15 is set to be the surface contact, the contact between the housing 2 and each of the fourth piece 15d and the fifth piece 15e of the metallic member 15 is not limited to the surface contact. Either point-contact or line-contact may be employed as the contact therebetween. However, in consideration of the accuracy of assembling the electrically conductive metallic member 15 and the bezel 10 and the stability of the electromagnetic wave shielding characteristics, preferably, the contact between the housing 2 and each of the fourth piece 15d and the fifth piece 15e is surface-contact.

Meanwhile, the metallic member 15 is shaped by punching. However, in a case where projections, such as burrs, generated at that time disturb the assembling of the metallic member 15 and the bezel 10, it is preferable that the fourth piece 15d and the fifth piece 15e of the metallic member 15, from which the projections protrude, are covered with electrically conductive protection tape 21. Consequently, the workability at the assembling of the metallic member 15 and the bezel 10 can be enhanced.

Figure 9A:
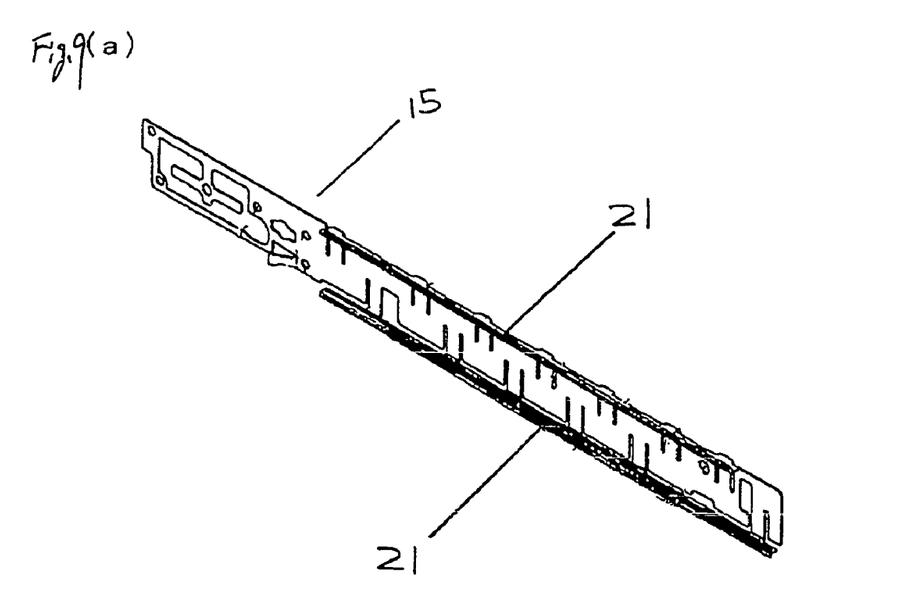
FIGS. 9A and 9B are views each illustrating a manner in which the metallic member of the embodiment of the invention is covered with protection tape.
Figure 9B:
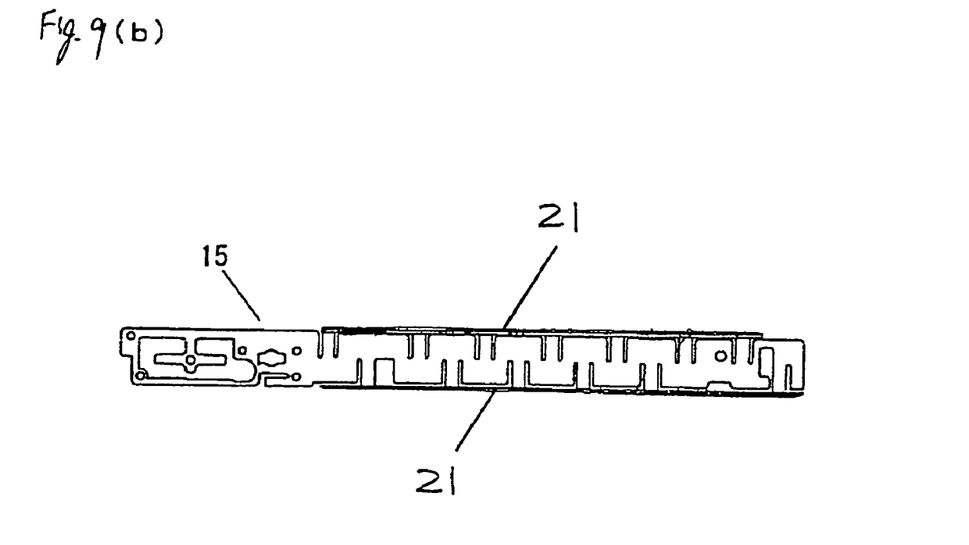
Figure 10A:
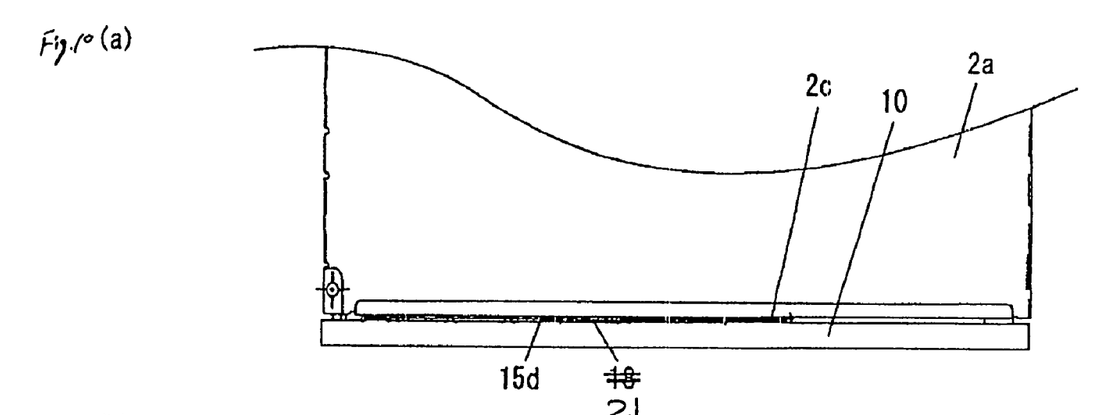
FIGS. 10A and 10B are views each illustrating a manner in which the housing and electrically conductive protection tape of the optical disk apparatus according to the embodiment of the invention are in contact with each other.
Figure 10B:
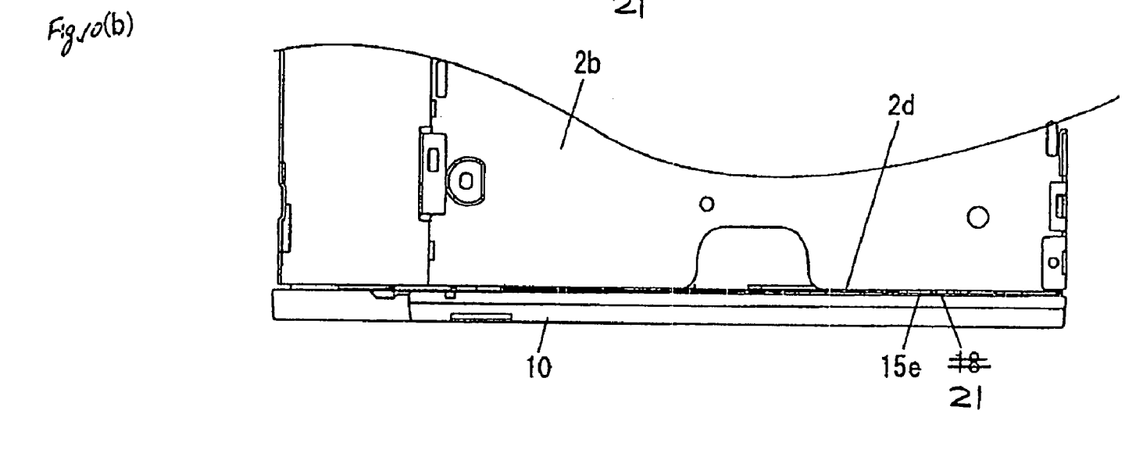

FIGS. 9A and 9B are views each illustrating a manner in which the metallic member of the embodiment of the invention is covered with the protection tape. FIG. 9A is an external perspective view taken from the tray side. FIG. 9B is a plan view taken from the tray side. FIGS. 10A and 10B are views each illustrating a manner in which the housing and the electrically conductive protection tape according to the embodiment of the invention are in contact with each other. FIG. 10A is a view showing the upper housing portion. FIG. 10B is a view showing the lower housing portion.

In the aforementioned embodiment, in a case where the metallic member is disposed in the bezel and where the tray is accommodated in the housing, at least a part of the metallic member is in contact with the housing. Thus, the grounding line for each of the housing and the metallic member is strongly assured. Consequently, the embodiment can reliably prevent external electromagnetic waves, which adversely affect an operation of the optical disk apparatus, by the simple configuration from entering the optical disk apparatus. Thus, the embodiment can realize an optical disk apparatus enabled to stabilize the electromagnetic wave shielding characteristics and to enhance productivity.

The metallic member includes the first piece, the second piece, the third piece, the fourth piece, and the fifth piece, which are adapted so that each of the second piece and the third piece adjoins the first piece by being inclined thereto by substantially 90°, that each of the fourth piece and the fifth piece adjoins a corresponding one of the second piece and the third piece by substantially 90°, and that the second piece faces the third piece so that the second and third pieces extend in parallel to each other. Consequently, at least one of the pieces of the metallic member can be in contact with the housing by the simple configuration. Thus, the grounding line for each of the housing and the metallic member is strongly assured. Consequently, the embodiment can reliably prevent external electromagnetic waves, which adversely affect an operation of the optical disk apparatus, by the simple configuration from entering the optical disk apparatus. Thus, the embodiment can realize an optical disk apparatus enabled to stabilize the electromagnetic wave shielding characteristics and to enhance productivity.

At least one of the pieces of the metallic member is in contact with the surface extending in the direction of thickness of the main flat portion of the housing. Thus, the shielding effect of the metallic member can reliably be obtained. Consequently, the embodiment can reliably prevent external electromagnetic waves, which adversely affect an operation of the optical disk apparatus, by the simple configuration from entering the optical disk apparatus. Thus, the embodiment can realize an optical disk apparatus enabled to stabilize the electromagnetic wave shielding characteristics and to enhance productivity.

At least one of the second piece and the third piece of the metallic member is substantially parallel to the main flat portion of the housing. Thus, at least one of the pieces of the metallic member can be in contact with the surface extending in the direction of thickness of the housing. Consequently, the grounding line for each of the housing and the metallic member is strongly assured. Thus, the embodiment can reliably prevent external electromagnetic waves, which adversely affect an operation of the optical disk apparatus, by the simple configuration from entering the optical disk apparatus. Consequently, the embodiment can realize an optical disk apparatus enabled to stabilize the electromagnetic wave shielding characteristics and to enhance productivity.

A gap is provided between the bezel and a surface of at least one of the fourth piece and the fifth piece of the metallic member. Thus, at least one of the fourth piece and the fifth piece can easily be in contact with the surface extending in the direction of thickness of the housing. Consequently, the grounding line for each of the housing and the metallic member is strongly assured. Thus, the embodiment can reliably prevent external electromagnetic waves, which adversely affect an operation of the optical disk apparatus, by the simple configuration from entering the optical disk apparatus. Consequently, the embodiment can realize an optical disk apparatus enabled to stabilize the electromagnetic wave shielding characteristics and to enhance productivity.

The metallic member is fitted to the bezel in a direction perpendicular to the main flat portion of the bezel. Thus, the embodiment can realize an optical disk apparatus enabled to stabilize the electromagnetic wave shielding characteristics and to enhance productivity.

The metallic member has at least one of the notch and the through hole. Thus, the elasticity of the metallic member can be enhanced. Consequently, the control of the positional relation between the metallic member and the bezel can easily be performed. Thus, the embodiment can realize an optical disk apparatus enabled to stabilize the electromagnetic wave shielding characteristics and to enhance productivity.

The invention can reliably prevent external electromagnetic waves, which adversely affect an operation of the optical disk apparatus, by the simple configuration from entering the optical disk apparatus. Thus, the invention can realize an optical disk apparatus enabled to stabilize the electromagnetic wave shielding characteristics and to enhance productivity. The invention can be applied to an optical disk apparatus adapted to perform at least one of recording and reproducing of information on or from an optical disk by using an optical pickup.

This application is based upon and claims the benefit of priority of Japanese Patent Application No. 2004-201549 filed on Apr. 7, 2008, the content of which is incorporated herein by references in its entirety.

What is claimed is:

1. An optical disk apparatus, comprising: a housing; a tray, retractably mounted in the housing; a bezel, adapted to close an opening of the housing when the tray is accommodated in the housing; and a metallic member, disposed in the bezel; wherein at least a part of the metallic member is in contact with the housing, when the tray is accommodated in the housing, wherein the metallic member is disposed on the bezel to extend over substantially the entirety of width of the tray.

2. The optical disk apparatus according to claim 1, wherein the metallic member has first, second, third, fourth and fifth pieces adapted so that each of the second piece and the third piece adjoins the first piece by being inclined thereto by substantially 90°; and each of the fourth piece and the fifth piece adjoins a corresponding one of the second piece and the third piece by substantially 90°; and the second piece and the third piece face to each other and extend substantially in parallel to each other.

3. The optical disk apparatus according to claim 2, wherein at least one of the fourth piece and the fifth piece is in contact with a surface extending in a direction of thickness of a main flat portion of the housing when the tray is accommodated in the housing.

4. The optical disk apparatus according to claim 2, wherein at least one of the second piece and the third piece of the metallic member is substantially parallel to a main front portion of the housing.

5. The optical disk apparatus according to claim 2, wherein a gap is provided between the bezel and at least one of the fourth piece and the fifth piece.

6. The optical disk apparatus according to claim 1, wherein the metallic member is fitted to the bezel in a direction perpendicular to a main front portion of the bezel.

7. The optical disk apparatus according to claim 1, wherein the metallic member has at least one of a notch and a through hole.

* * * * *